United States Patent [19]

Ashany et al.

[11] 3,748,647

[45] July 24, 1973

[54] TOROIDAL INTERCONNECTION SYSTEM

[75] Inventors: Ron Ashany; Arwin B. Lindquist, both of Poughkeepsie, N.Y.

[73] Assignee: International Business Machines Corporation, Armonk, N.Y.

[22] Filed: June 30, 1971

[21] Appl. No.: 158,177

[52] U.S. Cl. .................... 340/172.5, 178/50, 179/15

[51] Int. Cl. .................... G06f 15/16

[58] Field of Search .................... 340/172.5; 328/43, 328/44, 45; 179/15; 178/50, 53

[56] References Cited

UNITED STATES PATENTS

| | | | |
|---|---|---|---|
| 3,239,764 | 3/1966 | Verma et al. | 340/172.5 |
| 3,529,089 | 9/1970 | Davis et al. | 179/15 |
| 3,483,329 | 12/1969 | Hunkins et al. | 179/15 |
| 3,475,733 | 8/1969 | Gaines et al. | 340/172.5 X |
| 3,350,689 | 10/1967 | Underhill et al. | 340/172.5 |
| 3,544,976 | 12/1970 | Collins | 340/172.5 |

*Primary Examiner*—Paul J. Henon
*Assistant Examiner*—John P. Vandenburg
*Attorney*—William S. Robertson et al.

[57] ABSTRACT

Units of a data processing system intercommunicate on ring connections of shift registers. A message placed in one shift register stage is advanced from stage to stage until it is removed at a destination stage or at an intermediate stage. Several rings are interconnected in a toroidal arrangement so that a message can be transferred at an intermediate stage from one ring to an adjacent ring. Logic is provided for advantageously routing the message between the initial stage and the destination stage.

10 Claims, 4 Drawing Figures

INVENTORS
RON ASHANY
ARWIN B. LINDQUIST
BY [signature]
ATTORNEY

TOROIDAL INTERCONNECTION SYSTEM

RELATED APPLICATIONS

Application Ser. No. 129,747, of W. T. Comfort and G. Radin, for "Shift Register Interconnection of Data Processing System," filed Mar. 31, 1971 and assigned to the assignee of this invention, teaches an improved interconnection of stages of a single ring.

THE INVENTION

In a ring shift register interconnection system, shift registers are organized in a way that is analogous to a circular conveyer belt so that a message placed on the ring at an initiating stage circulates around the ring until it is received at a destination stage. Ring systems have been proposed for systems having large numbers of processors, memories, or other units. However, in a large system the length of the ring may undesirably slow transmission between units. A general object of this invention is to provide a new and improved system in which several rings are interconnected to provide close communication between stages of the same ring and between stages of different rings.

According to this invention, shift registers are connected to form rings and units of the system are connected between rings to form an arrangement that will be called a "band." The ring at the bottom of a band shifts in the opposite direction from the ring at the top, and units on the same band are thus closely connected to every other unit of the same band.

Means is provided for each segment of a band for transferring messages from one ring to another ring of the band, and a message format is provided from which a processor located between the initiating stage and the destination stage can read a message and select an appropriate path to the destination unit.

The arrangement of bands is extended in a configuration that is analogous to the surface of a cylinder so that messages can be transmitted along rings and segments to provide close transmission between any units of the system. Preferably, the segments form closed loops to give a configuration that is analogous to a toroid.

THE DRAWING

THE SYSTEM OF THE DRAWING

Introduction

Figures 1, 2, 3, 4:
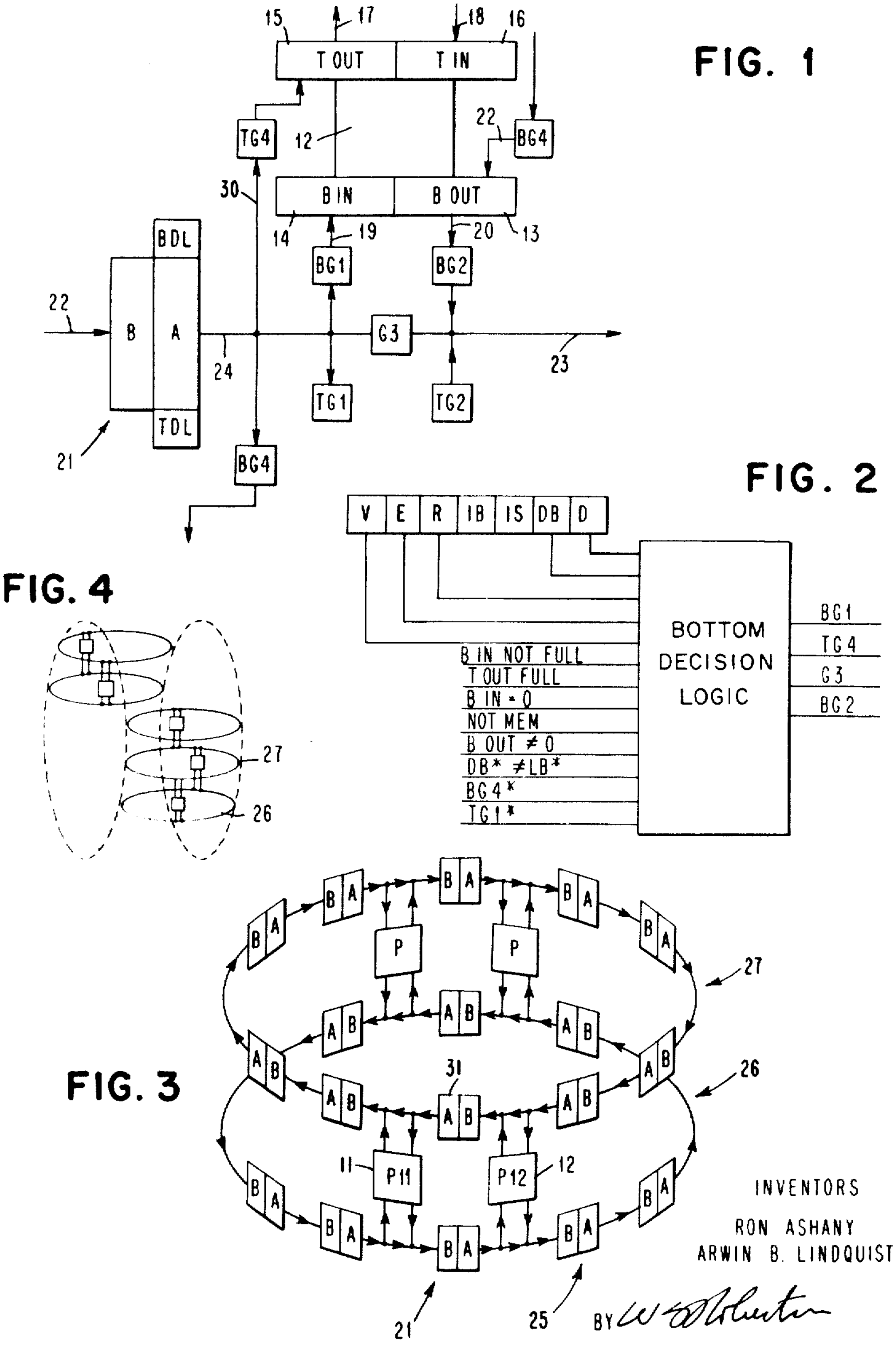
FIG. 1 shows an elemental unit of the system of this invention.
FIG. 2 shows the preferred format of control and address portions of a message and the details of a circuit of FIG. 1 that operates on these bits.
FIG. 3 shows the units of FIG. 1 connected with other units into a band.
FIG. 4 shows several bands of FIG. 3 formed into a toroid.

This part of the specification will describe the general features of the preferred embodiment of the invention as it is shown in both FIGS. 1 and 3. Later the apparatus of FIG. 1 will be described in detail and the full array illustrated in FIG. 4 will be described.

FIG. 1 shows a processor 12 (or other unit of a data processing system such as a memory). Two input buffers 14 and 16 receive messages intended for unit 12 and two output buffers 13 and 16 hold messages originated by unit 12 and intended for other units of the data processing system. Because unit 12 and other components are arranged in an ordered geometric array, the input buffer 16 and the output buffer 15 that are uppermost in the drawing will be called the "top" buffers and are designated T OUT and T IN in FIG. 1 and in the control signals of FIG. 2. Similarly, buffers 13 and 14 will be called the "bottom" buffers, and these buffers and their control signals are designated B OUT and B IN.

FIG. 1 also shows a register stage 21 having an input 22 and an output 24. Gates which will be described later interconnect register stage 21 with processor 12 and other components of the system. A line 23 forms an input to the next register stage in the system. Register stage 21 comprises an input register B and an output register A. In one step of a shift operation, a message in register B is transferred to register A; in the next step, a message in register A is transferred to register B of the next register stage or to processor 12 or other units of the system not shown in FIG. 1.

In the simplified schematic of FIG. 3, the buffers 13, 14, 15 and 16 are shown as part of processor 12. The gates connecting processor 12 and register stage 21 are indicated generally by arrowed lines that show the data paths established by the gates. Register stage 21 is connected to supply messages at the input of a next register stage 25. Register stages 21 and 25 and other stages are interconnected to form a ring 26. A message placed in one of the B registers of ring 26 is transmitted from stage to stage until it is removed by the gating and logic circuits from the output of an A register.

Similarly, register stages are interconnected to form an upper ring 27. Processor 12 communicates with ring 27 through buffers 15 and 16 and their connections 17, 18 (shown in FIG. 1) to the ring. A processor 11 and other units of the system are connected to rings 26, 27 in the same way as processor 12. Preferably, a unit is connected to the ring between each pair of adjacent register stages; to simplify the drawing, only four such units are shown.

An interconnection of processors or other units with two rings as shown in FIG. 3 will be called a "band." In the complete array that will be described later, a ring is associated with an upper band and with a lower band. Thus, the processors and interconnections of FIG. 3 form an upper band for ring 26 and a lower band for ring 27. Additionally, in the full array, connections from ring to ring are provided through the gating and logic circuits of FIG. 1. An array or processors of other units and the register stages and associated logic and gating circuits for transmitting a message from ring to ring (vertically in the drawing) form a unit that will be called a "segment." Thus, a processor has a unique address according to its band and segment.

The Message Format

FIG. 2 shows the format of a message that is to be transmitted on the interconnection system of FIGS. 1 and 3. The message has a data portion that is not shown in the drawing and it has the following control fields.

Bit V is a validity bit. A 1 in this position of a message addressed to unit 12 signifies that the register contains valid data that is to be routed to the input buffer 14 of the destination unit. Bit V is set to 0 after the message has been read by the destination unit, and a 0 signifies that the slot in the shift register network is available to receive a message from the output buffer 13 of unit 12 or from some other unit of the network. The 0 also signifies that the other control and addressing bits of the message are to be ignored.

Bit E signifies whether the message is to be handled by the top band or the bottom band with which a register is associated. Thus, a 1 in register 21 or FIG. 1 signifies that the data is to be routed upward along a segment or is to be transferred to a unit in the same band as processor 12, and a 0 signifies that the message is to be routed downward along a segment or to be read by a unit of the next lower band.

A 1 in the R position of the message signifies that the data is on the correct ring of the addressed band. The message can be transmitted on either ring of the addressed band, but if the rings are long it is preferable to select the shorter path. The R bit permits a non-destination processor to accept the data, select the shortest path, and set the R bit to show that no further processing is necessary to route the message to its destination.

Field IB identifies the initiator band and field IS identifies the segment of the unit that initiated the message. Fields DB and DS similarly give the band and segment address of the destination unit.

The Circuit of FIG. 1

From the preceding introductory description of the system of this invention, the details of the circuit of FIG. 1 should be more readily apparent. The processor 12, the buffers, and the register stage 21 have been introduced already. From the introductory description of FIG. 3, it can be seen that the output 23 of gate G3 is applied to the register stage 25 to the right of FIG. 1 as an input that is a counterpart of the input 22 to stage 21. Gate G3 is controlled to transmit the message on line 24 to line 22. When gate G3 is opened, messages in register A of stage 21 are transmitted to register B of stage 25. When gate G3 is closed, lines 24 and 22 are isolated and messages can be entered on line 22 and retrieved from line 24.

A gate BG1 transmits messages from output line 24 of register stage 21 to bottom in buffer 14. Similarly, a gate TG1 transmits a message from line 24 to the top in buffer (not shown) in the lower band corresponding to buffer 16 in FIG. 1. Thus, a message on ring 27 in FIG. 3 is transmitted on line 18 to top in buffer 16 of processor 12.

A gate BG2 transmits messages from bottom out buffer 13 to line 23. Similarly, a gate TG2 transmits messages from the next lower band of the same segment to line 23, and a message from top out buffer 15 is transmitted to ring 27 from the output 17 of top out buffer 15.

A line 30, a gate TG4, and the top out buffer 15 and its output 17 cooperate to transmit a message from register stage 21 of ring 26 to a register 31 (FIG. 3) of the next upper ring 27 of the same segment. Similarly, a gate BG4 is shown both as it interconnects register stage 21 and the bottom out buffer of the next lower band and as it connects the upper ring 27 through an input 22 to bottom out buffer 13. From FIG. 3, it can be seen that the alternating direction of the rings 26, 27 define segment transmission paths through register stages 21 and 31 of FIG. 3 and similarly aligned register stages of other bands.

The data paths that have been described so far in terms of the message format of FIG. 2 and the gates of FIG. 1 are controlled by a bottom decision logic circuit BDL and a top decision logic circuit TDL shown in FIG. 1. The bottom decision logic circuit which is shown in detail in FIG. 2 will be described next.

The Decision Logic of FIG. 2

As FIG. 2 shows, the bottom decision logic block produces outputs that control the gates BG1, TG1, G3 and BG2. (By symetry, the top decision logic block controls gates TG1, BG4, G3, and TG2.) Thus, the bottom decision logic is associated with the bottom gates of a band; the top decision logic is associated with the top gates of the lower band, and both logic circuits control gate G3. The decision logic blocks receive the control and address bits of a message that have been described already and other signals that will be described as they are introduced in the description of the operation of the gates of FIG. 1. The logic blocks also generate intermediate logic functions that are shown as inputs.

Gate BG1 is opened to transmit a message from register A to bottom in buffer 14 when the buffer is available to accept the message (B IN NOT FULL, a signal conventionally provided with a buffer), and the fields DB and DS identify that the message is addressed to processor 12 and bit V signifies that the message is valid. Ordinarily, gate G3 is closed ($\overline{G3}$ = 1) in response to the conditions that permit opening gate BG1. If the message is addressed to processor 12 but buffer 14 is full, gate G3 remains open.

Gate BG1 is also opened for transmitting certain messages to bottom in buffer 14 that are not addressed to processor 12. The processor can respond to the control bits in the message to further control the routing of the message, specifically with the circuit of FIG. 2 to route the message to the other ring of the band. For this operation, gate BG1 is opened when the message is addressed to the band of processor 12 (DB equals LB, the local band address which is held in the logic block), the message is not on the correct ring (R=1) the buffer 14 is empty (B IN = 0), and unit 12 is a processor or other device with appropriate logic capabilities as contrasted with a memory (NOT MEM, a status signalled by the unit or the logic block). Thus, a message in register stage 21 of ring 26 (FIG. 3) which was addressed to processor 11 but not accepted by the processor could be transferred from ring 26 to ring 27 by processor 12 and then entered in processor 11 from ring 27 without continuing along the full length of ring 26.

The top decision logic for controlling gate TG1 is a direct counterpart of the logic just described for controlling gate BG1.

The bottom decision logic block opens gate TG4 to transmit a message upward along a segment when the message is valid (V = 1), the message is to be handled by the bottom decision logic block (E = 1), buffer 15 is not full (T OUT NOT FULL), and the message is on the wrong band (DB ≠ LB, an intermediate logic function formed in the bottom decision logic) but the message is not addressed to the immediately lower band (DB* ≠ LB*, an input from the top logic block). The top decision logic block has counterpart logic for opening gate BG4. To summarize from a different view point, the E field of the message establishes whether the message is to be routed up or down along a segment line. The field DB stops the up or down transfer when the message reaches either ring of the addressed band.

The bottom decision logic block opens gate BG2 at the output 20 of the bottom out buffer 13 and the top decision logic block opens the corresponding gate TG2 when there is a message in the buffer (B OUT $\neq$ 0) and gate G3 has been closed as a result of some operation that creates a vacancy in the B register of register stage 25 (output $\bar{G}3 = 1$). When both bottom out buffer 13 and the corresponding top out buffer of the next lower band have messages, priority is resolved by the decision logic blocks. For example, priority may be arbitrarily assigned to each bottom out buffer by including the condition B OUT $\neq$ 0 in the top decision logic for opening gate TG2. The decision logic blocks are readily adaptable to other priority resolving schemes which are well known and do not need to be specifically described.

Gate G3 is closed in response to the signals from the bottom decision logic block opening gates BG1 or TG4 or signals from the top decision logic block opening gates BG4 or TG1. Gate G3 is also closed when the A register holds an invalid message (V = 0).

A simple summary of the logic circuits just described is provided by considering the various inputs to the bottom decision logic blocks. The signal B IN NOT FULL signifies that buffer 14 can accept messages. The signal T OUT FULL signifies that buffer 15 can accept messages that are to be applied from ring 26 to ring 27. The signal B IN = 0 signifies that there are no messages in buffer 14 waiting to be accepted by the processor (as contrasted with the signal already described, B IN NOT FULL), so that processor 12 can transfer a message to ring 27 with less delay than another processor with the intervening shift register stages. NOT MEM signifies that unit 12 is available for handling messages addressed to other units. B OUT $\neq$ 0 signifies that the bottom out buffer 13 is ready to transmit a message to ring 26. It also signifies that buffer 13 has priority over the top out buffer of the next lower band. The signal DB* $\neq$ LB* signifies in the bottom decision logic block that the message is not being routed to the next lower unit by the top decision logic block. The signals BG4* and TG1* are produced by the top decision logic block and signify that an operation by the top decision logic block to open these gates closes gate G3.

The functions just described are implemented in combinatorial logic circuits and the actual arrangement of components to perform the functions will be evident from the preceding description and the characteristics of the particular logic circuits to be used.

The Toroidal Array of FIG. 4

The circuit of FIG. 1 is connected to extend the array of FIG. 3 to a desirable number of bands. Preferably, the segment lines also form closed loops so that the structure is analogous to a toroid as shown in FIG. 4. The toroid is of course a geometrical representation of the interconnections and not of the physical arrangement of the components and the interconnecting conductors. Furthermore, because the network is not in fact a geometrical toroid, certain interconnections are possible that are not physically realizable on a geometrical surface.

With this interconnection system, a large number of processors, memories, and other units of a data processing system can be interconnected with minimum paths between the units and with improved flexibility for handling messages. From the description of the preferred embodiment of the invention, those skilled in the art will recognize a variety of applications for the invention and modifications within the spirit of the invention and the scope of the claims.

What is claimed is:

1. A shift register interconnection system for transferring messages between units of a data processing system, comprising,
   - a plurality of shift registers and means connecting said shift registers into a plurality of rings whereby a message entered at one location on a ring can be shifted in a predetermined direction to the register associated with a destination unit of the same ring,
   - means connecting each unit to receive and transmit messages at corresponding locations on two adjacent rings to form a band of interconnected units, each of said units occupying a segment of a band, and
   - means associated with each unit to transfer a message from one of said rings to another whereby messages can be transferred along appropriate ring and segment lines of the array between a message initiating unit and a destination unit.

2. A shift register interconnection system for transferring messages between units of a data processing system, comprising,
   - a plurality of shift registers and means connecting said shift registers into a plurality of rings whereby a message entered at one location on a ring can be shifted in a predetermined direction to the register associated with a destination unit of the same ring, said message including a destination segment address field and a bit position signifying whether the message is on an appropriate ring,
   - means connecting each unit to receive and transmit messages at corresponding locations on two adjacent rings to form a band of interconnected units, each of said units occupying a segment of a band, and
   - means associated with each unit and responsive to said bit signifying whether the message is on an appropriate ring to transfer a message from one ring to another of a band to provide an improved path between a message initiating unit and a destination unit and to set said bit to signify that a further such operation is unnecessary.

3. The system of claim 2 including means connecting said units and shift registers in a plurality of bands with rings connecting adjacent bands and arranged to transfer messages between adjacent upper and lower bands and further including means to resolve priority of access to a ring between upper and lower units.

4. The system of claim 3 including in a message a field defining a segment address and a band address and means for responding to said message address to transfer a message from one ring to another along segments lines of the array.

5. The system of claim 4 including means connecting said segment lines in closed loops to form an ordered array of units.

6. The system of claim 5 including means connecting said segment lines to form closed loops whereby the array is analogous to a toroid.

7. The system of claim 6 wherein said units include input and output buffers for the two adjacent rings and said means for transferring messages along said segment lines includes gates connecting a shift register output to the output buffers associated with the adjacent rings and logic means responsive to the segment address of a message for controlling said gates.

8. The system of claim 7 including means connecting said gates to transfer a message from a shift register to said output buffers, to said input buffers or to the next register in the ring and said system further includes logic means responsive to address and control bits in a message and to status signals from said buffers for controlling said gates to route a message.

9. The system of claim 8 wherein said logic means comprises a first logic circuit for the adjacent upper band and a second logic circuit for the adjacent lower band, and each said circuit includes means for comparing the band and segment address of a message with a local band and segment address for routing messages to an adjacent unit.

10. The system of claim 9 wherein said message includes a bit signifying whether the logic operation is to be performed by a first or a second logic circuit and each said logic circuit further includes means responsive to said message and to the non-coincidence of the message segment and band addresses with the local band and segment address of the associated logic circuit to transfer the message to the output buffer of the adjacent ring of the associated band.

* * * * *